United States Patent [19]

Duncan et al.

[11] 4,391,673
[45] Jul. 5, 1983

[54] BASEMENTLESS SEPARATOR SYSTEM

[75] Inventors: Jeffrey B. Duncan, Argyle; Joseph A. Bolton, Glens Falls, both of N.Y.

[73] Assignee: Albany International Corp., Menands, N.Y.

[21] Appl. No.: 302,721

[22] Filed: Sep. 16, 1981

Related U.S. Application Data

[63] Continuation of Ser. No. 123,098, Feb. 20, 1980, abandoned.

[51] Int. Cl.³ .............................................. D21F 1/48
[52] U.S. Cl. .................................... 162/217; 162/252; 162/364; 137/391; 137/411
[58] Field of Search ............... 162/252, 364, 211, 217; 55/46, 144, 167, 169; 137/391, 392, 411

[56] References Cited

U.S. PATENT DOCUMENTS

| | | | | |
|---|---|---|---|---|
| 2,885,118 | 5/1959 | Remke | ................................. | 137/391 |
| 3,272,691 | 4/1966 | Shera | ................................. | 142/252 |

OTHER PUBLICATIONS

Form No. 313 of Albany Engineered Systems Div. 8/10/79.

Primary Examiner—William F. Smith
Attorney, Agent, or Firm—Kane, Dalsimer, Kane, Sullivan & Kurucz

[57] ABSTRACT

A basementless separator system for removing liquid from a liquid/gaseous mixture. The system includes a separator for separating the liquid and gas therein. A first conduit communicates the separator with the source of the liquid/gaseous mixture. A secnd conduit communicates the separator with a vacuum source to draw the liquid/gaseous mixture into the separator and to remove the separated gas from the separator. A first valve is on the separator in alignment with a liquid storage tank to open and close a discharge opening for separated liquid from the separator to be collected in the storage tank. A second valve is on the storage tank to open and close a drainage opening in the tank to control drainage of liquid therefrom. A level sensor is on the tank to indicate a predetermined level of collected liquids stored in the tank. Controls are responsive to the liquid condition in the tank to open and close the valves and periodically drain from the tank the liquid collected therein. The system is particularly adaptable for the papermaking and textile industries, for example in dewatering processes, where air is passed through a wet web under the force of vacuum to collect water therefrom and the resultant mixture of water and air is subsequently separated.

20 Claims, 2 Drawing Figures

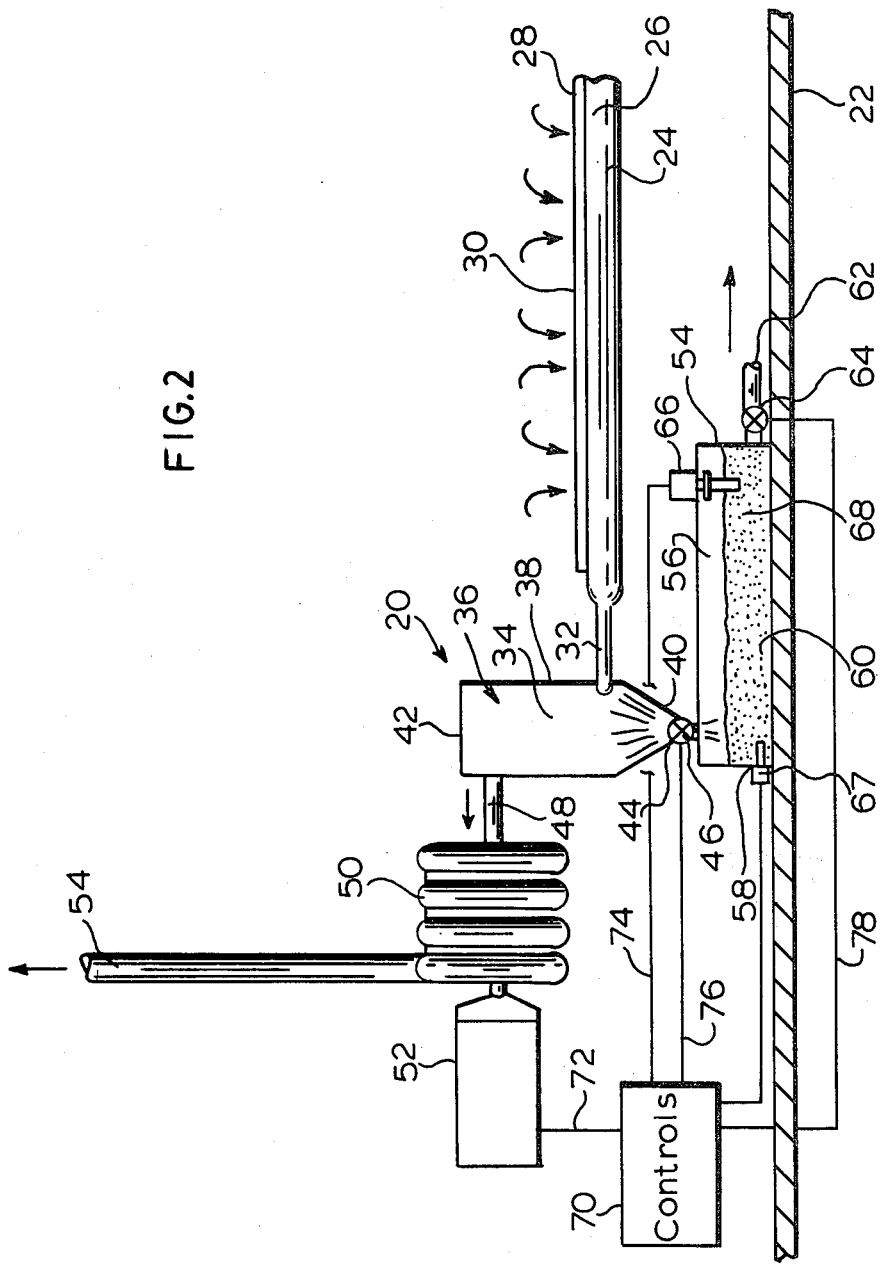

BASEMENTLESS SEPARATOR SYSTEM

This is a continuation of application Ser. No. 123,098, filed Feb. 20, 1980, now abandoned.

BACKGROUND OF THE INVENTION

In many industrial environments various types of liquid and gas mixtures are formed which require separation at a later point in the manufacturing procedure. One particular area in which this occurs is in connection with industrial dewatering processes.

Two particular industrial applications for dewatering processes are in the textile industry and in the papermaking industry. Papermaking machinery, particularly the wet end of the machinery, is commonly used to dewater wet webs such as papermaker's felts. Suction box and suction pipe systems are used with an appropriate vacuum source to draw air through the felt and collect water within the pipe which is then directed to a separation station for separation of the water and air.

Currently used systems which operate effectively present other concerns. They are generally large and unwieldy causing the manufacturer to utilize large manufacturing areas for the separation process. In one effective system of separator technology presently in use, a suction pipe is placed beneath a moving, wet web, and has the function of mechanically sucking water from the web. The water ladened air passes into the side of a centrifugal separator. The spinning action in the separator separates the water from the air. The water runs down a funnel shaped floor of the centrifugal separator and into an elongated standpipe. The extremely elongated standpipe extends into a sealed pit in the basement of the manufacturing facility. The relatively dry air leaves the centrifugal separator near the top and passes through a blower exhauster or vacuum pump which exhausts to atmosphere. The purpose of the blower or vacuum pump is to cause the air motion through the system. The key feature in that type of system is the standpipe with its associated seal pit. Typically, a distance of 15 feet from the bottom of the separator to the floor of the basement is needed and this could increase in certain environments up to 30 feet. The purpose for the standpipe and seal pit is to trap the vacuum in the centrifugal separator and suction pipe, while allowing water to be removed from the system. The height of the water in the standpipe determined by the vacuum level in the system. Clearly, improvement is needed for consolidating the system so that there is an advantageous savings in manufacturing space and in equipment cost.

The ideal answer is to utilize a basementless separator system. The paper industry currently has a system of that type in use. In that system, the water from the centrifugal separator dumps directly into a holding tank. A level sensor, usually a mechanical float type, senses the level of the water in the tank. A centrifugal pump removes water from the bottom of the tank, and sends it to the drain through a valve. The position of the valve is controlled by the height of the water, as sensed by the level detector. Thus, the height of the water and the holding tank is held relatively constant. In its current application in the paper industry, the linear output liquid level sensors can clog up with paper pulp from the water. Also, a pump is needed, which runs 100 percent of the time. Not only does this result in an inefficient system in the paper industry but it is completely unacceptable for use in dewatering procedures in other industries such as the textile industry. The position controlled valve on the output of the pump is normally operating in a partly opened condition. Due to the high fiber content in the water the partially opened valve can rapidly become plugged in fiber. It also becomes very difficult to get linear output liquid level sensors which are insensitive to fiber and debris in the water.

SUMMARY OF THE INVENTION

With the above background in mind, it is clear what type of improvements are desirable in the development of separation systems particularly of the basementless kind. Accordingly, it is an objective of the present invention to provide an improved basementless separator system. An overall objective is to provide an equipment cost saving and to provide for more efficient and less costly use. A basement is no longer required nor is the equipment used to extend the system into a basement.

It is an objective to provide a basementless separator for use in the textile industry, the papermaking industry and related or similar industries, particularly those which require dewatering processes for mixtures such as air and water.

A further objective is to provide a basementless separator without a standpipe and seal pit. The separator which may be of a conventional centrifugal type includes a valve at the discharge opening at the bottom of the separator. A storage tank is placed beneath the discharge opening and a level sensor is in the storage tank at a predetermined height. A second valve is located at the bottom of the storage tank. Conventional type of control panels such as an electrical system is utilized to operate the drainage system. At the start of operation the valve in the separator is open and the valve at the bottom of the storage tank is closed. This is the condition when the storage tank is empty. The dewatering system, employing a conventional blower, exhauster, or vacuum pump, is utilized to apply a vacuum in a suitable vacuum pipe system to a wet web and draw air through the web collecting a mixture of water and air in the vacuum pipe. This mixture is drawn into the separator, centrifugal or the like, which separates the water and air. The relatively dry air is drawn off from the separator and disposed of in a conventional manner such as by the vacuum pump or blower. The separated water is discharged through the open valve at the bottom of the separator into the storage tank. The storage tank is empty when the system is started. Thus, in normal operation, the water flows from the separator through the valve at the discharge opening at the bottom of the separator into the storage tank. When the level of water in the storage tank reaches the level sensor, a signal is sent to the electrical control panel. The panel sends signals which cause the valve on the separator to close first, followed by the opening of the valve on the storage tank. At that point, all of the water drains from the tank. The drain time is determined by an electrical timer in the control panel or, alternatively, a second level sensor can be placed near the bottom of the storage tank to positively sense the empty condition of the tank.

At the end of the drain time interval, or when the lower sensor detects the empty tank condition, the control panel sends additional signals which cause the valve in the storage tank to close first followed by the opening of the valve in the separator. This returns the system to its original condition and the tank begins once again to fill.

The type of level sensor and its orientation through the wall of the storage tank adds to the efficiency of operation of the system. Due to the type of web being dried, for example in the papermaking industry, the drainage water contains pulp or fiber contamination. This contamination can buildup on the level sensor and spoil its operation unless proper measures are taken to prevent this. Thus, a particular type of liquid level sensor is chosen which is relatively insensitive to contamination buildup. The sensor is then positioned through the wall of the storage tank so that it is at a location where it has minimum exposure to contamination.

The system of the present invention is acceptable for use in the papermaking industry, the textile industry and other similar or related industries particularly those which produce mixtures of liquid and gas and later separation of the liquid/gaseous mixture.

In summary, a basementless separator system is provided for removal of liquid from a liquid/gaseous mixture. The system includes a separator having means for separating the liquid and gas therein. First conduit means is provided communicating with the separator and with the source of the liquid/gaseous mixture. A second conduit means communicates with the separator and with vacuum producing means to draw the liquid/gaseous mixture into the separator and to remove separated gas from the separator. A first valve means is on the separator in alignment with a liquid storage tank to open and close a discharge opening for separated liquid from the separator to be collected in the storage tank. A second valve means is on the storage tank to open and close a drainage opening in the tank to control drainage of liquid therefrom. A level sensing means is on the tank to indicate a predetermined level of collected liquid stored in the tank. Control means is responsive to liquid conditions in the tank to open and close the valves and periodically drain from the tank liquid collected therein.

With the above objectives among others in mind, reference is made to the attached drawings.

BRIEF DESCRIPTION OF THE DRAWINGS

In The Drawings:

FIG. 2 is a schematic view of an alternative embodiment of the basementless separator system of the present invention.

DETAILED DESCRIPTION

Figure 1:
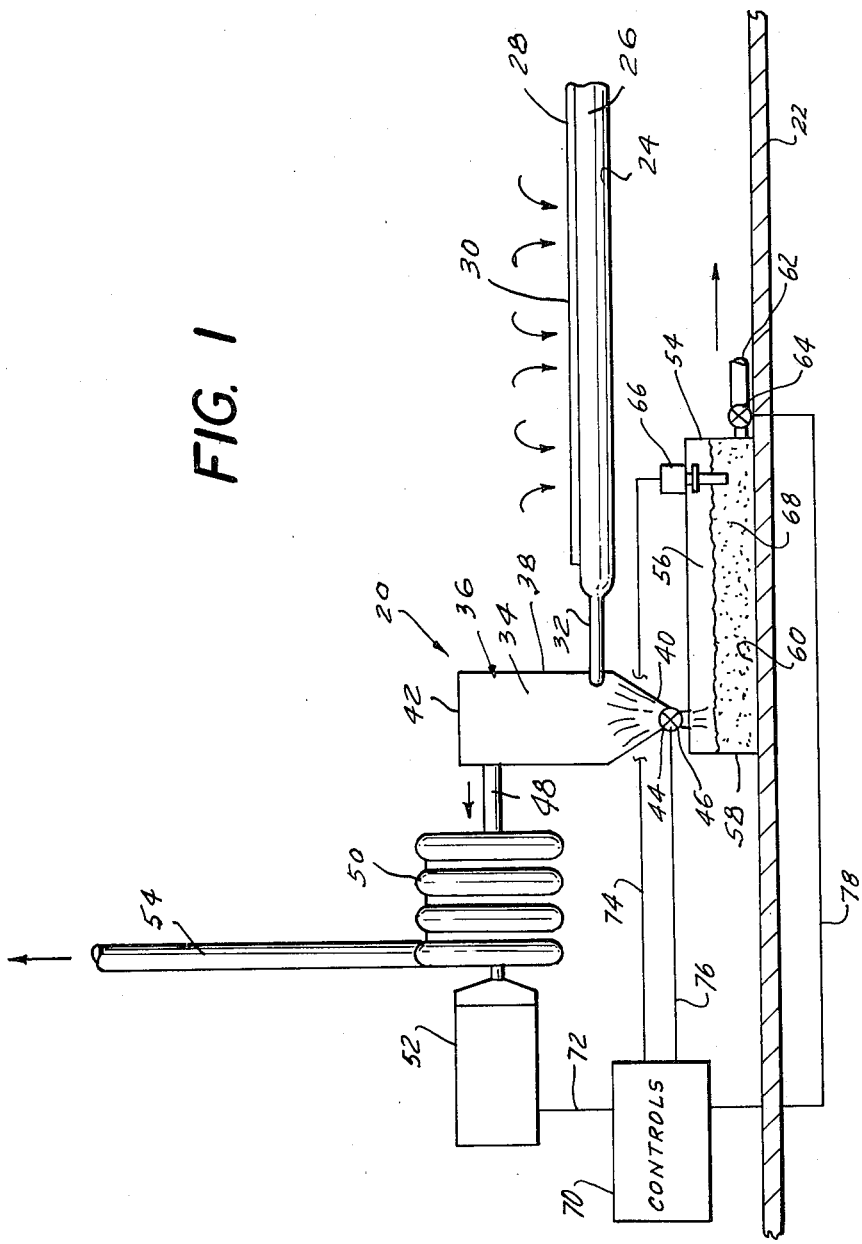
FIG. 1 is a schematic view of the basementless separator system of the present invention.

FIG. 1 shows the basementless separator system 20 of the present invention in use as part of a conventional type of dewatering system. The separator system 20 is compact in nature, as discussed above, so that it can be housed within a portion of a single floor of a manufacturing facility. The system is shown resting on a floor 22 in a building and does not require extension into a basement area.

System 20 is interconnected with a conventional type of suction dewatering arrangement such as a suction pipe 24 having a hollow interior 26 and having spaced openings along its length covered by a slot cover 28. The conventional type of slot cover provides openings in alignment with the openings through the suction pipe to the hollow interior 26 thereof. The upper surface 30 of the slot cover 28 forms a wear surface over which the wet web travels. By application of suction to the interior 26 of pipe 24 air is drawn through the web and through the openings in the slot cover 28 into the interior 26 of pipe 24. As it passes through the web it collects water from the web and the mixture of water and air collects in the hollow interior of pipe 24. The arrows in FIG. 1 show the direction of movement of air through the substrate and into the pipe 24. This procedure is conventional and well known in the art as shown and described for example in U.S. Pat. No. 3,836,428.

A hollow conduit 32 communicates at one end with the interior 26 of pipe 24. The other end communicates with the hollow interior 34 of a separator 36. The interconnections are made in a conventional manner. The separator 36 is also a conventional well known device such as a centrifugal separator. Conduit 32 extends into the separator intermediate the top and bottom thereof.

Separator 36 has an upper portion formed with a cylindrical wall 38 and an inwardly tapering wall portion at the lower end to form a funnel shaped lower portion 40. The upper end 42 is closed and the funnel shaped lower portion 40 terminates in a bottom discharge opening 44. A valve 46 is located at discharge opening 44 to open and close the discharge opening.

Adjacent to closed upper end 42 of separator 36 is a second conduit 48 which has one end in communication with the interior 34 of separator 36 and the other end in communication with a conventional type of blower 50. Once again the connections are made in a conventional manner. The first conduit 32 enters separator 36 at the bottom end of cylindrical wall 38 adjacent to the beginning of the funnel shaped lower portion 40.

A suitable motor 52 drives blower 50 which can be replaced by any other conventional vacuum producing means, such as a vacuum pump. The object of blower 50 is to provide vacuum in the system and to dispose of the air separated from the liquid in the separator 36. Air drawn from the separator through conduit 48 by blower 50 exits through discharge tube 54 to atmosphere.

Positioned beneath discharge opening 46 of separator 36 is a storage tank 54. The storage tank 54 has an open upper end 56, a peripheral side wall 58 and a closed bottom 60. As customary in systems of the present type, storage tank 54 and separator 36 are connected in a conventional well known manner by a connecting conduit to provide for communication between their interior so that water can be directed from discharge opening 44 through the connecting conduit into opening 56. Extending through the side wall 58 of tank 54 adjacent to the bottom 60 is a drainage conduit 62. A second valve means in the form of drainage valve 64 is located where drainage conduit 62 interconnects with the interior of storage tank 54.

Also mounted on storage tank 54 is a liquid level sensing means in the form of level sensor 66. The level sensor 66 is one which is commercially available. For example a Model FTC 1730 level sensor manufactured by Endress and Hauser Inc. of Greenwood, Ind. is acceptable for use in the present system. Level sensor 66 is also oriented with respect to the tank so that contamination is minimized as will be discussed in detail below. Level sensor 66 is positioned intermediate the height of peripheral wall 58 of the tank at a chosen position to determine an acceptable limit to the amount of liquid 68 collected in the storage tank 54.

Suitable controls 70 of a conventional nature are employed to operate system 20. It has been found effective to use electrical controls to operate the separator system 20 as shown in the depicted embodiment. However, alternatively, mechanical or pneumatic controls can also be used to effectively operate the system. As shown, electrical controls 70 are connected by electrical connection 72 to motor 52 for operating blower 50. Through electrical connection 74 the controls 70 are connected to valve 46 on separator 36. Similarly, through electrical connection 76 the controls 70 are connected to level sensor 66. Also, by means of electrical connection 78 the controls 70 are connected to the valve 64 at the assembly point of tank 54 and drainage conduit 62.

In operation, at startup, when tank 54 is empty, the controls have valve 46 open and valve 60 closed. Motor 52 is operated by controls 70 to cause blower 50 to apply vacuum to the system including separator 36 and connected storage tank 54. Through interconnected conduit 48, separator 36 and conduit 32 vacuum is applied to the interior 26 of vacuum pipe 24. This causes air to be drawn through a water laden web traveling across slot cover 28. The web is moved in a conventional well known fashion by appropriate drive means. The air passing through the web collects water and the water and air mixture passes through the openings in cover 28 and pipe 24 to the hollow interior 26 of the pipe. By the same vacuum force, the mixture of water and air passes through conduit 32 into centrifugal separator 36. Separator 36 is a conventional well known type of separator. The spinning action of the separator 36 separates the water from the air. The water runs down the funnel shaped bottom portion 40 of separator 36 and through discharge opening 44 into storage tank 54 through the appropriate conventional connection therebetween. The relatively dry separated air exits separator 36 through conduit 48 and into blower 50 where it is exhausted through exhaust tube 54.

The system continues in the above manner under vacuum with the absolute pressure less than atmospheric until the level of water 68 in storage tank 54 reaches the level sensor 66. Then, through electrical connection 76 a signal is sent to the electrical controls 70. The controls 70 respond to actuate valve 46 through electrical connection 74 causing valve 46 to close first. This prevents further water from exiting through discharge opening 44. Thereafter, electrical controls 70 signal discharge valve 64 through electrical connection 78 to open. The water 68 in tank 54, which is now under atmospheric pressure due to the above valve operated sequence, then drains through drainage conduit 62 in the direction shown by the arrow in FIG. 1. In the depicted embodiment, the drain time is determined by a conventional electrical timer incorporated as part of control 70. Alternatively, a second level sensor could be placed near the bottom 60 of tank 54 to positively sense the empty condition of the tank. This is shown in the alternative embodiment of FIG. 2 where second level sensor 67 is employed in a system 20 otherwise similar in structure and operation to the embodiment of FIG. 1. Similar parts bear the same numbers in the embodiments of FIGS. 1 and 2.

At the end of the drain time interval, or when the second lower sensor detects the empty tank condition, controls 70 send signals through electrical connection 78 to valve 64 to cause valve 64 to close first and, thereafter, sends signals through electrical connection 74 to valve 46 to cause valve 46 to open. This returns the system to its original condition at startup and the tank begins once again to fill. As stated above, level sensor 66 should be oriented in a desirable manner with respect to storage tank 54. Due to the type of web being dried, the drainage water contains pulp or fiber contamination. This contamination can buildup on the level sensor and interfere with its operation unless proper measures are taken to prevent this. Thus, level sensor 66 is chosen for its insensitivity to contamination buildup.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. A basementless separator system for removing liquid from a liquid/gaseous mixture comprising; a separator including means for separating the liquid and gas therein, first conduit means communicating with the separator and with the source of the liquid/gaseous mixture, second conduit means communicating with the separator and with vacuum producing means to draw the liquid/gaseous mixture into the separator and to remove separated gas from the separator, first valve means on the separator in alignment with and connected to a liquid storage tank to open and close a discharge opening for separated liquid from the separator to be collected in the storage tank with the storage tank being subjected to the vacuum producing means when the first valve is open, second valve means on the storage tank to open and close a drainage opening in the tank to control drainage of liquid therefrom, level sensing means on the tank to indicate a predetermined level of collected liquid stored in the tank, and control means responsive to liquid collection in the tank to open and close the valves and periodically permitting liquid contained in the tank to drain under atmospheric conditions while the system is operating under vacuum and the absolute pressure is less than atmospheric.

2. The invention in accordance with claim 1 wherein the liquid/gaseous mixture is a combination of air and water and the separator system is part of papermaking machinery and the mixture of water and air is accumulated by drawing air through a wet web as part of a dewatering process.

3. The invention in accordance with claim 2 wherein the vacuum producing means is a blower which supplies vacuum to the system through the conduits connected to the separator including the first conduit which is open to the wet web to thereby apply vacuum for dewatering the wet web, the blower communicating with atmosphere for exhaust of the air removed from the separator through the second conduit.

4. The invention in accordance with claim 1 wherein the separator is a vertically disposed container with a hollow interior to form a separation chamber, the bottom portion of the separator being funnel shaped and terminating at the bottom in a discharge opening for removal of separated liquid from the chamber of the separator, the first valve means being located at the discharge opening at the bottom of the separator, the first conduit extending from the separator intermediate the top and bottom thereof and the second conduit extending from the separator adjacent to the top so that the first conduit is positioned intermediate the second conduit and the bottom discharge opening.

5. The invention in accordance with claim 4 wherein the separator is a centrifugal separator including means to provide spinning action to the liquid-gaseous mixture in the separator and separate the liquid from the gas.

6. The invention in accordance with claim 1 wherein initially the control means has the first valve means open and the second valve means closed with the storage tank being empty so that separation of the liquid/gaseous mixture in the separator causes separated liquid to flow through the discharge opening into the storage tank, the level sensing means responsive to a predetermined level of liquid in the storage tank to actuate the control means which causes the first valve means to close and the second valve means to open permitting the liquid to drain from the tank, and thereafter the controls close the second valve means and open the first valve permitting the storage tank to begin to fill again.

7. The invention in accordance with claim 6 wherein the control means closes the first valve means before opening of the second valve means to drain the storage tank and closes the second valve means before opening the first valve means after the storage tank has been emptied.

8. The invention in accordance with claim 1 wherein the control means is an electrical system and the time for drainage of the storage tank is determined by an electrical timer.

9. The invention in accordance with claim 1 wherein the level sensing means includes a level sensor mounted on the storage tank and exposed to the interior thereof at a predetermined height and the level sensor being substantially insensitive to contaminating materials in the liquid being collected in the storage tank.

10. The invention in accordance with claim 1 wherein the control means is an electrical system and the drain time is determined by the level sensing means including first and second level sensors mounted on the storage tank and exposed to the interior thereof, the first level sensor being located at a position indicating the maximum amount of liquid in the tank and the second level sensor being located adjacent the bottom of the tank indicating the empty condition of the tank.

11. A method of removing liquid separated from a liquid/gaseous mixture by use of a basementless separator system comprising; passing the liquid/gaseous mixture into a separator for separating the liquid and gas therein by applying vacuum to the separator and the source of a liquid/gaseous mixture to draw the liquid/gaseous mixture into the separator and remove separated gas from the separator, opening and closing a first valve at a discharge opening in the separator to control delivery of separated liquid from the separator to a liquid storage tank connected therewith for collection therein with the storage tank being subjected to vacuum when the first valve is open, opening and closing a second valve at a drainage opening in the storage tank to control drainage of collected liquid therefrom, sensing the level of liquid in the tank to indicate a predetermined level of collected liquid in the tank, and controlling the opening and closing of the valves responsive to the liquid condition in the tank to periodically permitting liquid contained in the tank to drain under atmospheric conditions while the system is operating under vacuum and the absolute pressure is less then atmospheric.

12. The invention in accordance with claim 11 wherein the liquid/gaseous mixture is a combination of air and water and the separator system is part of papermaking machinery and the mixture of water and air is accumulated by drawing air through a wet web as part of a dewatering process.

13. The invention in accordance with claim 11 wherein the vacuum producing means is a blower which supplies vacuum to the system through the conduits connected to the separator including the first conduit which is open to the wet web to thereby apply vacuum for dewatering the wet web, the blower communicating with atmosphere for exhaust of the air removed from the separator through the second conduit.

14. The invention in accordance with claim 11 wherein the separator is a vertically disposed container with a hollow interior to form a separation chamber, the bottom portion of the separator being funnel shaped and terminating at the bottom in a discharge opening for removal of separated liquid from the chamber of the separator, the first valve means being located at the discharge opening at the bottom of the separator, the first conduit extending from the separator intermediate the top and bottom thereof and the second conduit extending from the separator adjacent to the top so that the first conduit is positioned intermediate the second conduit and the bottom discharge opening.

15. The invention in accordance with claim 11 wherein the separator is a centrifugal separator including means to provide spinning action to the liquid/gaseous mixture in the separator and separate the liquid from the gas.

16. The invention in accordance with claim 11 wherein initially the control means has the first valve means open and the second valve means closed with the storage tank being empty so that separation of the liquid/gaseous mixture in the separator causes separated liquid to flow through the discharge opening into the storage tank, the level sensing means responsive to a predetermined level of liquid in the storage tank to actuate the control means which causes the first valve means to close and the second valve means to open permitting the liquid to drain from the tank, and thereafter the controls close the second valve means and open the first valve permitting the storage tank to begin to fill again.

17. The invention in accordance with claim 11 wherein the control means closes the first valve means before opening of the second valve means to drain the storage tank and close the second valve means before opening the first valve means after the storage tank has been emptied.

18. The invention in accordance with claim 11 wherein the control means is an electrical system and the time for drainage of the storage tank is determined by an electrical timer.

19. The invention in accordance with claim 11 wherein the level sensing means includes a level sensor mounted on the storage tank and exposed to the interior thereof at a predetermined height and the level sensor being substantially insensitive to contaminating materials in the liquid being collected in the storage tank.

20. The invention in accordance with claim 11 wherein the control means is an electrical system and the drain time is determined by the level sensing means including first and second level sensors mounted on the storage tank and exposed to the interior thereof, the first level sensor being located at a position indicating the maximum amount of liquid in the tank and the second level sensor being located adjacent the bottom of the tank indicating the empty condition of the tank.

* * * * *